United States Patent
Walton et al.

(10) Patent No.: US 8,259,346 B2
(45) Date of Patent: Sep. 4, 2012

(54) SELECTIVE EXTENDED GAMUT PRINTING SYSTEM AND METHOD

(75) Inventors: Robert D Walton, Santa Ana, CA (US); Orhan E Beckman, Vancouver, WA (US); Glen L Adams, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1211 days.

(21) Appl. No.: 11/787,511

(22) Filed: Apr. 17, 2007

(65) Prior Publication Data

US 2008/0259363 A1 Oct. 23, 2008

(51) Int. Cl.
*G06F 15/00* (2006.01)
*G06K 1/00* (2006.01)
*G03F 3/08* (2006.01)
(52) U.S. Cl. .................. 358/1.9; 358/518
(58) Field of Classification Search .............. None
See application file for complete search history.

(56) References Cited

U.S. PATENT DOCUMENTS

| | | | |
|---|---|---|---|
| 5,633,662 A | 5/1997 | Allen et al. | |
| 5,892,891 A | 4/1999 | Dalal et al. | |
| 6,285,784 B1 | 9/2001 | Spaulding et al. | |
| 6,335,983 B1 | 1/2002 | McCarthy et al. | |
| 6,585,340 B1 | 7/2003 | Borrell | |
| 6,606,165 B1 * | 8/2003 | Barry et al. ............ | 358/1.9 |
| 6,754,384 B1 | 6/2004 | Spaulding et al. | |
| 7,050,196 B1 | 5/2006 | Piatt et al. | |
| 7,110,140 B1 | 9/2006 | Buckley et al. | |
| 7,123,380 B2 | 10/2006 | Van de Capelle | |
| 2002/0051145 A1 | 5/2002 | Watanabe et al. | |
| 2003/0047099 A1 | 3/2003 | Hanyu | |
| 2003/0234943 A1 * | 12/2003 | Van Bael ............ | 358/1.9 |
| 2004/0001072 A1 * | 1/2004 | Newman ............ | 345/593 |
| 2004/0109180 A1 | 6/2004 | Braun et al. | |
| 2005/0063749 A1 | 3/2005 | Harris et al. | |
| 2005/0243343 A1 * | 11/2005 | Ng ...................... | 358/1.9 |
| 2006/0092195 A1 * | 5/2006 | Miwa ................... | 347/5 |
| 2006/0114497 A1 * | 6/2006 | Anderson et al. ...... | 358/1.15 |
| 2007/0098430 A1 * | 5/2007 | Hoffman et al. ....... | 399/82 |

* cited by examiner

*Primary Examiner* — King Poon
*Assistant Examiner* — Ming Hon

(57) ABSTRACT

Various embodiments of a system and method for selectively printing with an extended color gamut are disclosed.

6 Claims, 5 Drawing Sheets

SELECTIVE EXTENDED GAMUT PRINTING SYSTEM AND METHOD

BACKGROUND

High speed, high capacity color digital printing presses have become commercially available and are seeing wider use. These systems are particularly useful for short run print jobs and situations where printing flexibility is desired. In digital color printing systems, one or more print engines print full color images by sequentially printing individual component colors of ink. One common ink color set that is widely used is Cyan (C), Magenta (M), Yellow (Y) and Black (K), referred to collectively as CMYK. These systems can print color images that have quality comparable to those produced by conventional offset presses.

To provide a greater range of colors, digital printing systems with an extended color gamut, that is, additional component ink colors, are now being used. That is, instead of four ink colors, five, six, seven and even higher numbers of component colors are being used. These additional colors can include Red (R), Green (G), Blue (B), Orange (O), Violet (V), Light Cyan (LC), Light Magenta (LM), and others. Using more component colors allows the ink colors to combine to produce final colors within a broader color space. That is, a broader range of colors can be printed on the final document, allowing more realistic and pleasing colors in photographs, images, etc.

One of the barriers to wider adoption of extended gamut color printing with digital presses is the cost to benefit ratio. Printing with, for example, 6 colors, using six separations, is more expensive than printing with four colors (e.g. CYMK), in part because of the cost of additional ink. Additionally, the use of an extended color gamut in a digital printing system tends to increase the printing time. In one system, for example, it takes approximately 0.9 seconds to print each color. Since the colors are printed sequentially on a given page, it will take almost twice as long to print a page with seven colors as one with only four colors. While the cost of six-color printing can be easily calculated, the benefit of six colors or validation that the cost is worth it on a page-by-page basis is much more difficult to determine, requiring a time-consuming manual inspection process. Without a clear and reliable method of calculating the benefit to justify the cost, wider adoption of extended gamut color printing may be hindered.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
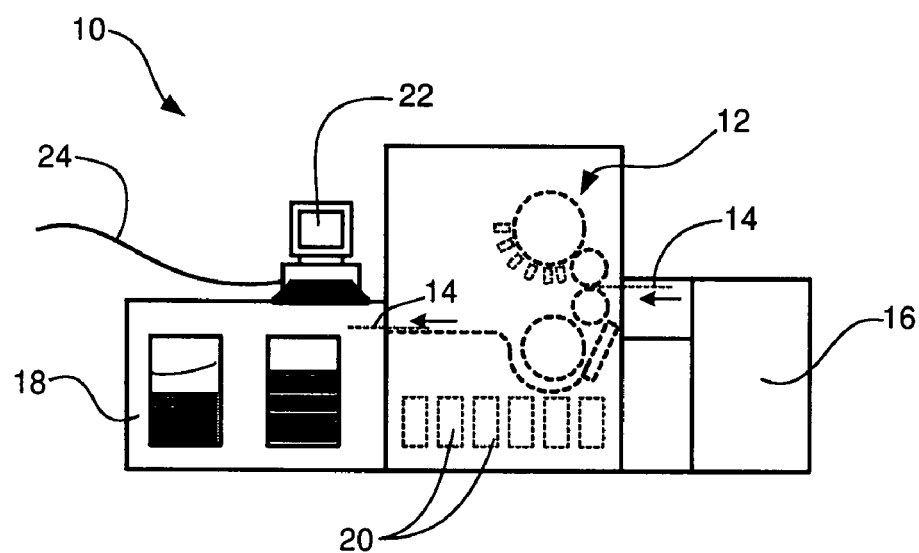
FIG. 1 shows one embodiment of a high speed digital printing system.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Extended gamut (e.g. 6 or more colors) color printing with digital printing presses is becoming more common and widely adopted. Shown in FIG. 1 is one embodiment of a high speed digital printing system 10. This system generally includes a print engine 12, to which sheets of media 14 (e.g. paper) are fed from a paper supply 16. Desired images and text are printed on the media by the print engine, which can then discharge the printed sheets to a sheet stacker 18 or other collation device.

Ink for the print engine 12 can be provided from a plurality of ink reservoirs 20 that can each contain a different color of print ink. While the printing system shown in FIG. 1 includes only one print engine, it is to be appreciated that this type of printing system is not limited to a single print engine. Digital printing systems with two print engines are currently available, and it is believed that digital presses today and in the future will be available with 3, 4 or more print engines. The print engine can include a light sensitive photo imaging plate (PIP), which completely erases after every image strike, so that each page can be unique, with no down time for plate changes between pages, as is required in conventional offset printing.

The printing press 10 is controlled by a computer 22 or other digital device that allows print data to be fed to the press, and converted into direct instructions for the print engine. As represented by communications line 24, print data can also be received via a network, such as a local area network (not shown) or a global network such as the worldwide web. These types of digital printing systems are becoming more popular because they are very flexible and adaptable to changes in print job content, and are economical for short run printing jobs.

In addition to the common CMYK four color gamut, five, six, seven and even higher numbers of component colors are being used in digital printing systems, such as Red (R), Green (G), Blue (B), Orange (O), Violet (V), Light Cyan (LC), Light Magenta (LM), and others. However, since each color is printed sequentially, extended gamut printing can take significantly longer than printing with a four-color process. More time equals more cost. Furthermore, the use of more component colors means more ink, which also presents an additional cost. With many printing systems it can be difficult for a user to determine whether the additional time and materials cost provides the desired benefit.

Two common approaches for calculating the benefit of 6 versus 4 color printing (for example) is to rely upon either a manual inspection and selection of proofed pages printed in 4 and 6 colors, or to seek expert advice. Both of these options are costly in terms of time and/or experience required. Because of the effort involved in making an accurate assessment of whether a target document will benefit from the extended gamut that six color printing can provide, one tendency is to either make an educated guess or simply choose six-color printing. This can result in lost opportunity when a customer prints content in 4-colors that could have benefited from 6, or prints content in 6 colors that could have been printed without gamut loss using the less costly 4 colors.

The inventors have recognized that not all pages in a multipage document can benefit from extended gamut colors. Some pages in a given document might be capable of being rendered in a more common (e.g. four-color) process. To this end, the present system looks at a multipage extended gamut (e.g. 6 color) color file, and it's imposition (the way the pages are laid out) and analyzes whether each page can be rendered in fewer colors (e.g. 4 color), or can benefit from the extended color gamut. If the extended gamut is not required, this system turns off the extra colors for that page only, saving the customer money, and reducing the time to print that page, and subsequently the whole print job.

It is helpful to understand the terminology that is used in reference to printing in this context. The term "page" refers to the data corresponding to the content on one page of the finished document. The term "sheet" refers to a single piece of print media, which can be printed with more than one page. Sheets also have two sides, and can have pages printed on one or both sides. A "document" comprises a group of one or more sheets having one or more pages printed thereupon.

Figure 2:
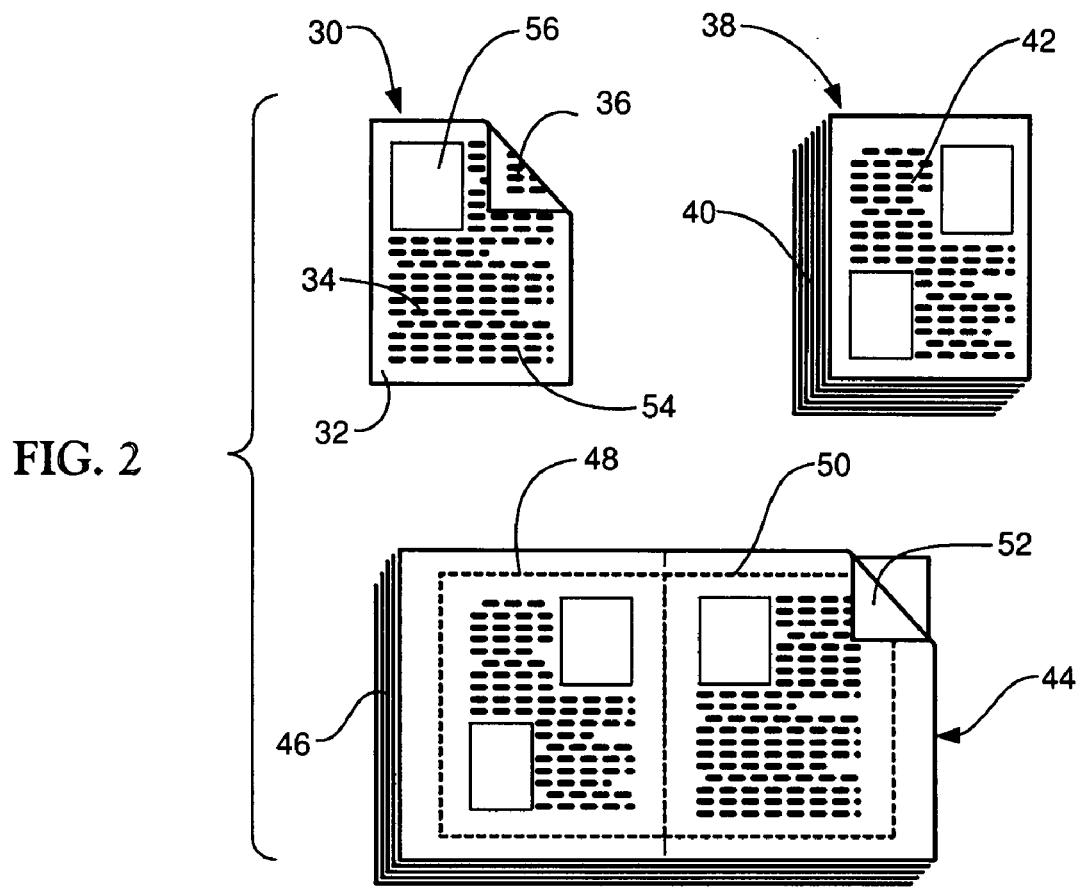
FIG. 2 shows three types of documents that can be printed with a high speed digital printing system.

Examples pages, sheets and documents are shown in FIG. 2. A sheet is a physical piece of print media (e.g. paper). Each sheet includes two surfaces or sides. A page is a group of printed elements (e.g. text blocks, graphics, etc.) that are grouped together and can be printed on either surface or side of a sheet. A document is one or more sheets having one or more pages printed upon them. Where a sheet contains two surfaces or sides (front and back), each surface can contain one or more pages, and each page can include multiple elements (e.g. text blocks, graphics, etc.).

As shown in FIG. 2, a first document 30 comprises one sheet 32 of media, which has one page 34 printed on a first surface or side, and a second page (not shown) printed on a second surface or side 36. Another document 38 comprises multiple sheets 40 that each include a page 42 on a first side. Still another document 44 comprises multiple sheets 46, each sheet having two pages (designated by outlined areas 48, 50) printed on a first side, and two pages (not shown) printed on the reverse side 52. This last document format, with two pages per side of a single sheet of media is a common format for printing magazine pages, brochures, etc., and is one example of what is referred to in the industry as 2-up printing. It is to be appreciated that there are a wide variety of printing formats, including other 2-up printing configurations. Viewing document 30, the various print pages can include text 54 and graphics 56, which can include color images, text, design elements, etc.

The present disclosure entails computer logic that analyzes the color content on a page-by-page basis, and compares the color gamut requirements of the page's contents with the gamut that could be provided by 1) a reduced or standard gamut (e.g. four-color) printing of the page, and 2) the gamut that could be provided by an extended color gamut printing of the page. If the color gamut requirement of the page does not exceed that of the reduced or standard color gamut (e.g. four colors), the page is identified and marked (e.g. as CMYK or 4 color). If the gamut requirement of the page exceeds that of the reduced color gamut, then the page's gamut requirements are compared with the extended gamuts of the known extended gamut (e.g. 6-color) configurations.

The term "color gamut" refers to a subset of the visible spectrum, or a certain complete subset of all visible colors. The most common usage of this term refers to the subset of colors which can be accurately represented in a given circumstance, for example by a certain output device, such as a printer. In another sense, the term is used to refer to the complete set of colors found within an image at a given time. Inked paper absorbs or reflects specific wavelengths of light depending upon the color of the ink. With CMYK printing, for example, cyan, magenta and yellow pigments serve as filters, subtracting varying degrees of red, green and blue from the light reflected from the page to produce a selective gamut of spectral colors. Other colors of print ink perform the same filtration function, but in a different spectral range.

Figure 3:
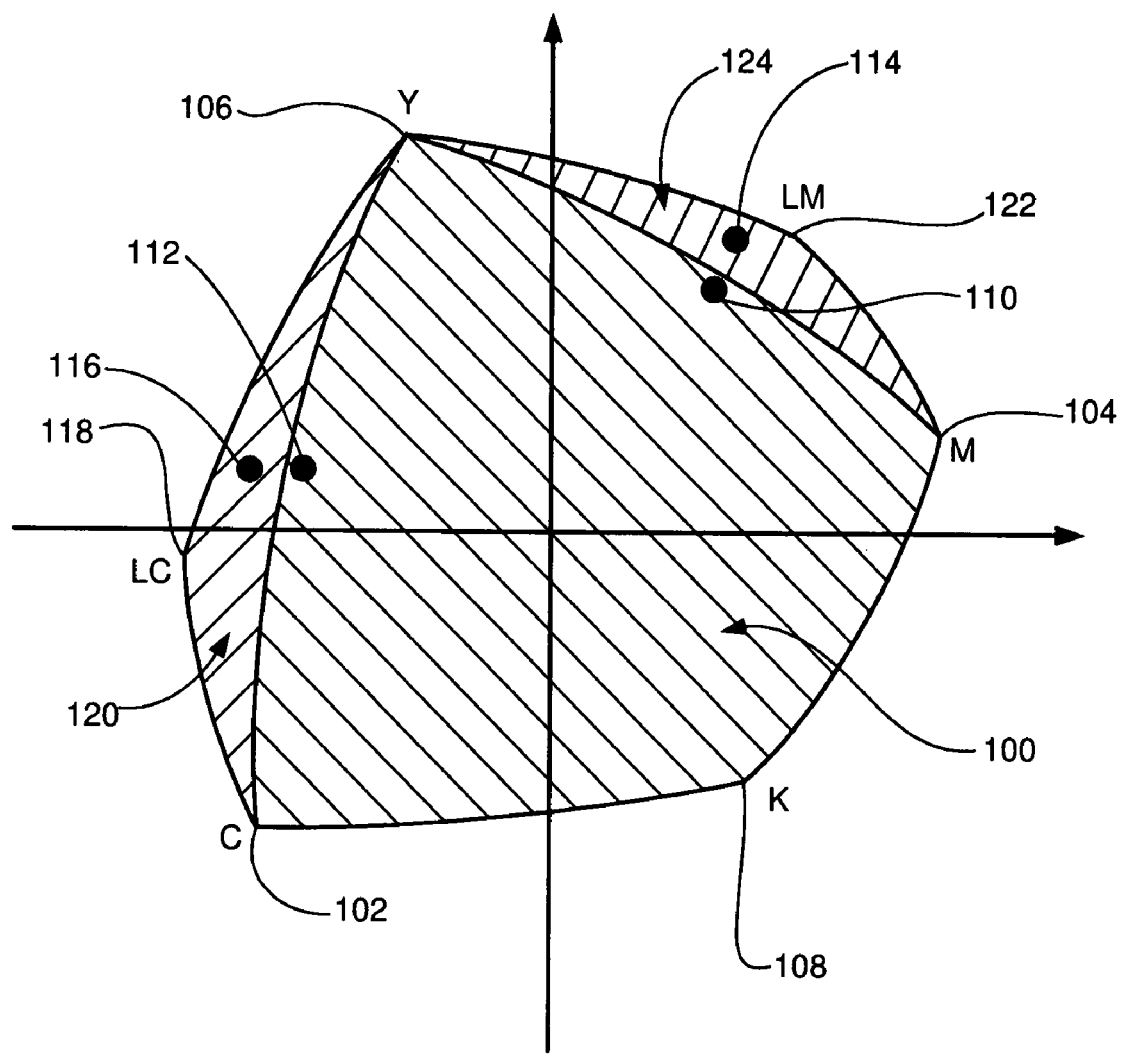
FIG. 3 is a representation of a color space, showing a range of colors available in CMYK color space, and additional color regions that become available when LC and LM colors are added.

A particular color gamut can be plotted as a color space differentiated by hue, saturation, and brightness. Shown in FIG. 3 is a representation of a theoretical color gamut 100 that is encompassed by the CMYK component colors. Each possible color can be plotted as a unique point in this type of space. The CMYK space is bounded by lines that extend between the positions of the component colors C (point 102), M (point 104), Y (point 106) and K (point 108). Because of the relative positions of these colors, all colors that are defined at points that lie within the bounded area can be printed using CMYK. For example, a color point 110 that lies within the CMYK color space represents a color that can be rendered using a CMYK printing process. Likewise, another color point 112 that lies within this space can be printed with this color gamut.

However, there are colors that cannot be produced using the CMYK color space. For example, color points 114 and 116 lie outside this color space. Consequently, they cannot be produced with the CMYK colors. To print these colors, extended gamut colors can be used. As shown in FIG. 3, if a light cyan (LC) ink color is added to the color gamut, providing a color located at 118, the color space expands to include an additional color space 120, so that the color at point 116 can be printed. Similarly, if a light magenta ink color is added, located at color point 122, this increases the color gamut to include additional color space 124, which includes color point 114, allowing this color to be printed.

Figure 4:
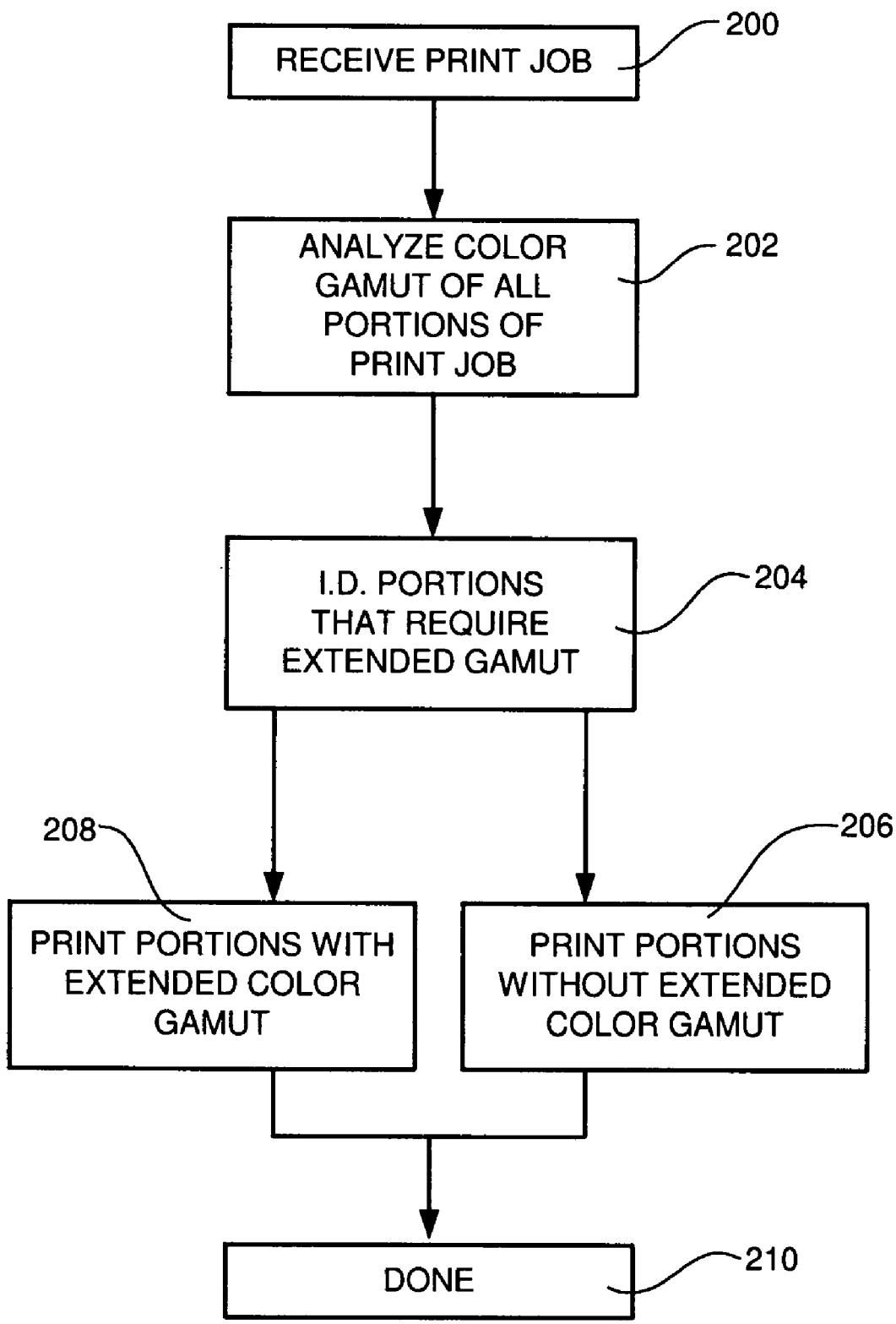
FIG. 4 is a flow chart showing the steps in one embodiment of a method for reducing print time and ink usage by analyzing the color gamut of individual portions of a print job, and using a reduced color gamut for selected portions.

A flowchart outlining one embodiment of the inventor's method is provided in FIG. 4. The analytical steps indicated by this and the other method embodiments outlined herein (e.g. FIGS. 5 and 6) can be performed by software that is resident in the printing system computer (e.g. computer 22 in FIG. 1), or the steps can be performed by some other computer system before the print job is sent to the digital printing press. Accordingly, each step or a group of steps outlined in the flowcharts of FIGS. 4-6 can be viewed as also representing an element of one or more computer programs that can be used in association with a digital printing press, whether these programs are directly stored in and performed by the printing press controller, or are stored elsewhere and performed by another computer device, such as a server or other computer system that is linked to or networked with the digital printing press.

The first step in the method embodiment shown in FIG. 4 is to receive the print job (step 200), which means to receive a file containing the data related to the print job. This data can comprise the entirety of a document, or it can represent only a part of an entire document.

The second step is to analyze the color gamut of all portions of the print job (step 202). As used herein, the term "portion" when referring to a print job is used to generally refer to any discrete part of the print data. Since documents are printed on a sheet-by-sheet basis, the term can refer to the print data corresponding to an entire sheet of media (e.g. both sides). Alternatively, "portion" can refer to the print data corresponding to one side of a sheet, or to a single page, or to a single element of a page.

Whether the portion is a sheet, a page, or a single element of a page, the process of analyzing the color gamut involves considering each color code in the portion under consideration, and determining where in the color space that color resides (as discussed above with respect to FIG. 3). Analysis of the color gamut of a given portion can involve a comparison of the digital color codes on a given page with a predetermined table of color code values and the print colors required to properly produce them. This sort of table can be created manually based upon experimentation and testing of various colors. Alternatively, an automated method of creation can be used, such as by printing all possible colors from a given printer, scanning the print with a spectrophotometer, and using the spectral results to automatically determine which color combinations are suitable for the given output color.

Once the colors are known, the system can identify portions of the print job that do not need an extended gamut (step 204). With reference to FIG. 3, for example, where the standard color gamut is CMYK, colors that do not need an extended color gamut would be those that lie within the CMYK color space 100. When the system identifies a portion that does not require the extended color gamut, the extended colors can be turned off for that portion, and that portion can be printed without the extended color gamut (step 206). Where the system identifies portions that include colors that lie outside the base color gamut, these portions are then printed with the extended color gamut (step 208).

The printing steps 206 and 208 can happen in various orders. Advantageously, digital presses can adjust print characteristics on a page-by-page, even element-by-element basis, though the pages are printed sheet-by-sheet, as noted above. Thus, for example, the system can analyze all sheets in a print job, then print all extended gamut sheets first, followed by all reduced gamut sheets, or vice versa. Such an approach could include a separate collation step to arrange the sheets in the desired order. Alternatively, the system can analyze all pages in an entire print job, determining which sheets, pages and/or elements can be printed without the extended gamut, before beginning to print any sheets, then print the sheets in the desired document order, thus avoiding the need for an additional collating step. As another alternative, once the color gamut of the pages to be printed on one sheet is identified, the system can print that sheet, then move to analysis of the next sheet in sequence. Other printing orders can also be followed. Whichever printing order is followed, each element of each page on each sheet can have a different color gamut. Once the printing is completed, the process is done (step 210).

The end result of the method described above is an ink configuration that is tailored to the document. The custom ink configuration under this method can be provided on a sheet-by-sheet, surface-by-surface, page-by-page or element-by-element level. If no element or page on a surface requires an extended color gamut, time and cost can be reduced by eliminating the extra impression(s) that would be required for an extended gamut, and saving the ink that would have been used in the extra impression(s).

On the other hand, if one element or page on a surface is determined to require an extended color gamut, the whole sheet side will require one or more extra impressions to provide the additional color(s) and create the extended gamut. In such a case, the time savings that the present method can provide may be lost. However, even where an extended gamut is required, the amount of color required in the extra impression can still be minimized by only providing the extra impression(s) (and thereby only using extra ink) on those pages or elements that require the extra gamut. Thus, under the present method cost is saved in terms of time and ink usage by determining 1) whether extended gamut is needed at all to reproduce the pages and elements on a surface, and 2) which pages and or elements on the surface need the extended gamut.

A sample result for a 2-up, duplex document comprising 12 pages and 4 sheets, where the user specified 2 potential ink configurations (CMYK and CMYK+light cyan (LC)+light Magenta (LM)) is provided below:

Sheet 1: Surface 1: Page 1: <CMYKLCLM>
Sheet 1: Surface 1: Page 2: <CMYK>
Sheet 1: Surface 2: Page 3: <CMYK>
Sheet 1: Surface 2: Page 4: <CMYKLCLM>
Sheet 2: Surface 1: Page 5: <CMYKLCLM>
Sheet 2: Surface 1: Page 6: <CMYK>
Sheet 2: Surface 2: Page 7: <CMYK>
Sheet 2: Surface 2: Page 8: <CMYK>
Sheet 3: Surface 1: Page 9: <CMYKLCLM>
Sheet 3: Surface 1: Page 10: <CMYK>
Sheet 4: Surface 2: Page 11: <CMYKLCLM>
Sheet 4: Surface 2: Page 12: <CMYK>

Figure 5:
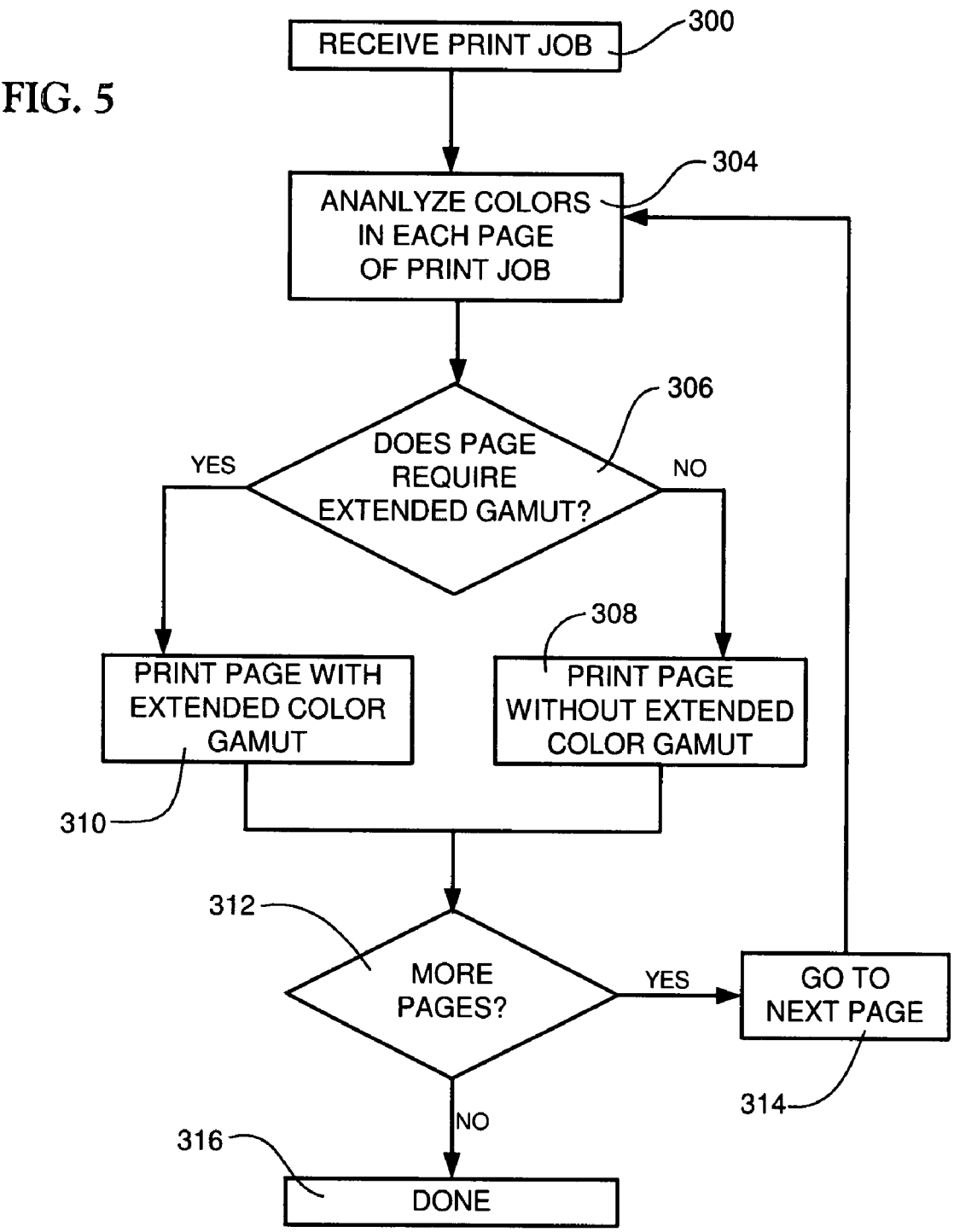
FIG. 5 is a flow chart showing the steps in another embodiment of a method for reducing print time and ink usage by analyzing the color gamut of individual pages in a print job, and using a reduced color gamut for selected pages.

A more detailed flowchart showing the steps in another embodiment of the present method is provided in FIG. 5. The steps outlined in this flowchart are given in terms of analyzing pages of the print job (rather than "portions" as expressed in FIG. 4), though as noted above, this is only one option. The steps outlined in FIG. 5 can proceed element-by-element, page-by-page, sheet-by-sheet, or in other ways. The first step in this embodiment is to receive the print job (step 300), then to analyze the colors in the first page file (step 304). This process involves considering each color code in the page, and determining whether each color resides within the base color gamut or within the extended color gamut.

Once the colors are known, the system considers whether that page requires an extended color gamut to print, or can be printed with the base color gamut (step 306). If the answer is no, and all colors in the given page fall within the base color gamut, the system allows printing (or establishes a command that will later direct printing) of the page without the extended color gamut (step 308). However, if the page requires the extended color gamut, that page is printed (or a command is created to later direct printing of the page) with the extended colors (step 310). The system then considers whether there are more pages in the print job (step 312), and if so goes to the next page (step 314) and repeats the analysis. Alternatively, if there are no more pages, the process is done (step 316).

Figure 6:
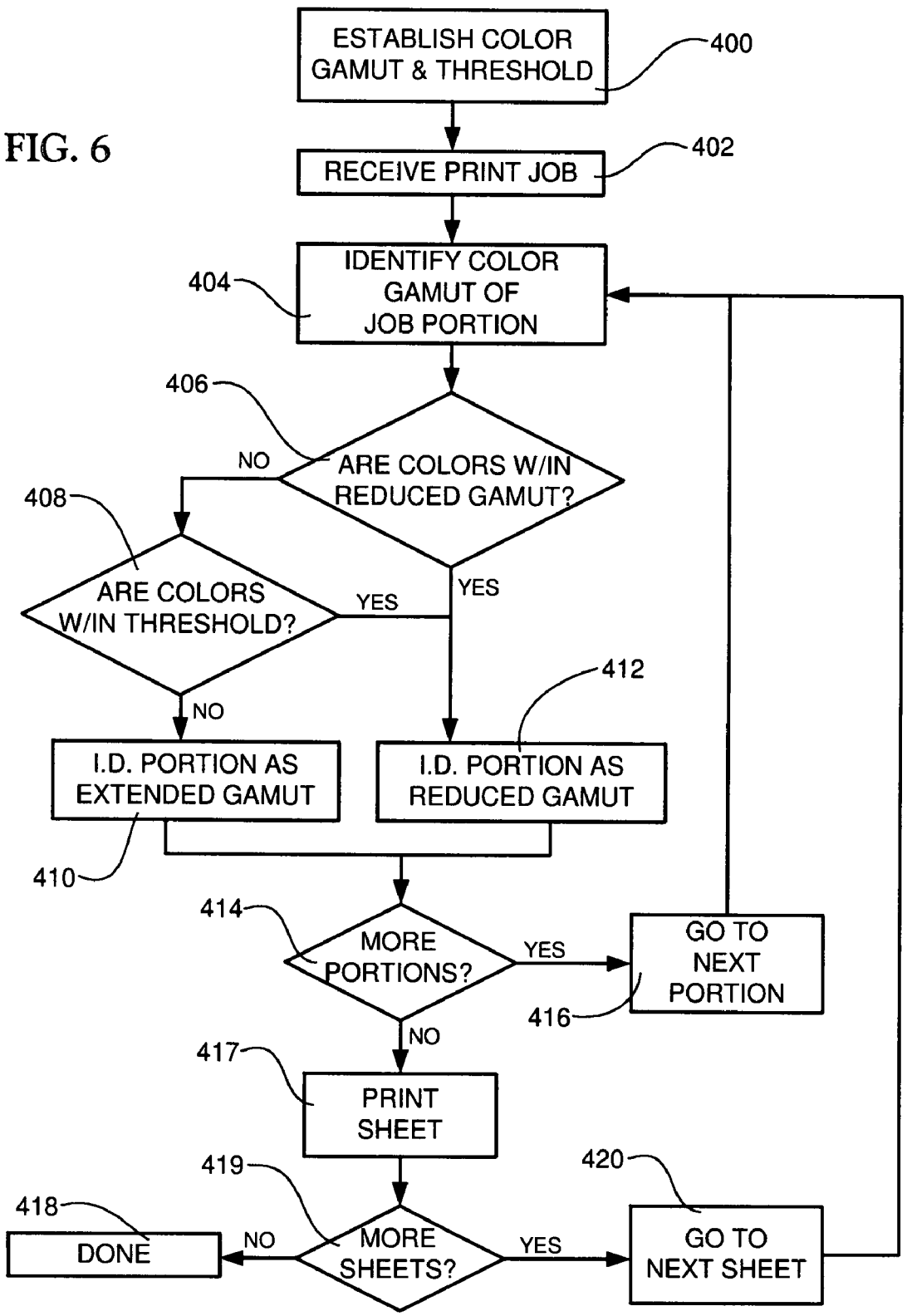
FIG. 6 is a flow chart showing the steps in another embodiment of a method for reducing print time and ink usage by analyzing the color gamut of individual portions of sheets of a print job, and using a reduced color gamut for selected portions.

Another embodiment of a method for analyzing extended gamut print files is outlined in FIG. 6. In this embodiment of the method, color gamut definitions and a color threshold are first established (step 400) before the print job is received (step 402). The color threshold is a setting that allows identification of colors that are outside the base color gamut, but are close enough to the color space boundary that a color within the base color space can be used to approximate the desired color. Where some colors are outside the reduced color gamut but are within a certain threshold, the system can map colors that lie outside the reduced color space but within the threshold to the closest approximate color within the base color space.

The color gamut definition can include one base color gamut and one or more extended color gamuts. It is to be appreciated that the system and method described herein is not limited to deciding between two color gamuts. For example, a system can have one base color gamut (e.g. four colors), with two or more additional colors that can be independently combined with the base color gamut as desired to produce more than one extended color gamut. Thus, for example, where six colors are available (e.g. CMYK, LC, LM) the base color gamut can comprise four colors (e.g. CMYK) with three additional extended color gamuts (e.g. CMYKLC; CMYKLM, and CMYKLCLM). Other combinations are also possible. Each extended color gamut can be defined in the system, allowing a variety of different combinations of colors to be used depending upon the needs of each portion of the print job, providing multiple avenues for saving time and ink.

After the color gamut and threshold are defined, the system analyzes the colors in a first portion of the print job (step 404). As discussed above, the portions of the print job that are considered at any one time can comprise anything from a single element up to one or more sheets. Once the colors have been analyzed, the system considers whether the portion of the print job under consideration can be printed with a reduced color gamut (e.g. the base color gamut) (step 406). If the answer is no, and all colors in the given portion do not fall within the base color gamut, the system considers whether the colors that are outside the base color gamut are nevertheless within the color threshold (step 408). If all colors are not within the reduced color gamut or within the threshold, that portion of the print job is printed (or a command is created to direct its later printing) with the extended color gamut (step 410).

However, if the portion does not require the extended color gamut as determined at step 406, or all colors are within the threshold as determined at step 408, the colors that lie within the threshold can be mapped to the closest color within the base color space, and the portion can be printed with a reduced color gamut (step 412) providing time and cost savings to the user.

The system then considers whether there are more portions in the particular sheet of the print job (step 414), and if so goes to the next portion (step 416) and repeats the analysis process. Alternatively, if there are no more portions in the particular sheet under consideration, the system can then print the given sheet (step 417). The system then considers whether there are any more sheets in the print job (step 419). If so, the system goes to the next sheet (step 420), returning to step 404 to repeat the analysis for all portions of the next sheet. Alternatively, if there are not more sheets in the print job, the process is done (step 418).

It is to be appreciated that the sequence of steps outlined in FIGS. 4-6 are not exclusive of each other, and that steps from the different approaches can be combined in different combinations. Additionally, as noted above, the printing step in each of the flow charts is not limited to the exact position indicated. For example, the system can analyze all sheets in a print job, then print all extended gamut sheets first, followed by all reduced gamut sheets, or vice versa, then later collate the sheets in the desired order. Alternatively, the system can analyze all pages in an entire print job, determining which sheets, pages and/or elements can be printed without the extended gamut, before beginning to print any sheets, then print the sheets in the desired document order with the determined color gamut, thus avoiding the need for an additional collating step. As yet another alternative, once the color gamut of the pages to be printed on one sheet are identified, the system can print that sheet, then move to analysis of the next sheet, and so on. Other printing orders can also be followed, and other combinations of the elements of the method can be used.

In various embodiments, the system and method disclosed herein compares the gamut for at least two color spaces and the logic to drive a choice of color space based on the variable content of a print job (i.e. color requirements within the elements of a print job). In the present disclosure the method attempts to compare two color gamuts to drive a workflow decision based on job content. This method makes a workflow choice between color gamuts based on static color spaces and variable (job) content.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:
1. A method comprising:
receiving a data file for a document including a sheet having a plurality of elements;
determining whether any element of the sheet requires an extended color gamut as opposed to a basic color gamut, the basic color gamut including a plurality of first colors, the extended color gamut including the first colors and a plurality of second colors different than the first colors;
printing the document with a digital printing press, comprising:
where any element on the sheet requires the extended color gamut:
printing the sheet with a print engine of the digital printing press using colorants corresponding to the first colors and to the second colors, including turning on the colorants corresponding to the second colors included in the extended color gamut but not in the basic color gamut, such that one or more elements of the sheet that do not require the extended color gamut are nevertheless printed using the extended color gamut due to one or more other elements of the sheet requiring the extended color gamut;
where no element of the sheet requires the extended color gamut:
turning off the colorants corresponding to the second colors included in the extended color gamut but not in the basic color gamut;
for each element of the sheet, causing the print engine to sequentially apply the colorants corresponding to just the first colors and not the second colors, such that all the elements of the sheet are printed just with the colorants corresponding to the first colors of the basic color gamut,
wherein the print engine of the digital printing press is an only print engine of the digital printing press, such that a same print engine corresponds to and prints the extended color gamut and the basic color gamut,
and wherein the colorants corresponding to the first colors that the print engine uses to print with the basic color gamut are the colorants corresponding to the first colors that the print engine uses to print with the extended color gamut.

2. The method of claim 1, wherein each colorant is a differently color inked provided at a corresponding ink reservoir, such that, for each first color as a given color, the print engine uses same differently colored ink from a same corresponding ink reservoir to print the given color regardless of whether the given color is being printed as part of the basic color gamut or as part of the extended color gamut.

3. The method of claim 1, wherein determining whether any element of the sheet requires an extended color gamut as opposed to a basic color gamut comprises, where a given element of the sheet requires the extended color gamut:

determining that colors of the given element that require the extended color gamut are approximated by the basic color gamut; and adjusting or substituting the colors of the given element that require the extended color gamut so that the colors are instead approximated by the basic color gamut such that the colors no longer require the extended color gamut.

4. The method of claim 3, wherein determining that the colors of the given element that require the extended color gamut are approximated by the basic color gamut comprises:

determining that the colors of the given element that require the extended color gamut are close to corresponding colors within the basic color gamut within a threshold.

5. The method of claim 1, wherein the first colors comprise cyan, magenta, yellow, and black.

6. The method of claim 5, wherein the second colors comprise red, green, blue, orange, violet, light cyan, and light magenta.

* * * * *